United States Patent
Kuang et al.

(10) Patent No.: US 12,411,326 B2
(45) Date of Patent: Sep. 9, 2025

(54) SUPER-RESOLUTION MICROSCOPIC IMAGING METHOD AND APPARATUS BASED ON COMMON-PATH PARALLEL FLUORESCENCE EMISSION DIFFERENCE MICROSCOPY

(71) Applicant: ZHEJIANG UNIVERSITY, Zhejiang (CN)

(72) Inventors: Cuifang Kuang, Hangzhou (CN);
Yuran Huang, Hangzhou (CN);
Zhimin Zhang, Hangzhou (CN);
Shaocong Liu, Hangzhou (CN); Xu Liu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 363 days.

(21) Appl. No.: 18/322,582

(22) Filed: May 23, 2023

(65) Prior Publication Data

US 2023/0296871 A1   Sep. 21, 2023

Related U.S. Application Data

(63) Continuation of application No. PCT/CN2021/133299, filed on Nov. 25, 2021.

(30) Foreign Application Priority Data

Nov. 27, 2020   (CN) .......................... 202011357705.0

(51) Int. Cl.
*G02B 21/00* (2006.01)

(52) U.S. Cl.
CPC ..... *G02B 21/0072* (2013.01); *G02B 21/0032* (2013.01); *G02B 21/0036* (2013.01); *G02B 21/0068* (2013.01); *G02B 21/0076* (2013.01)

(58) Field of Classification Search
CPC ............... G02B 21/00; G02B 21/0072; G02B 21/0076; G02B 21/0032; G02B 21/0036;
(Continued)

(56) References Cited

U.S. PATENT DOCUMENTS

| | | | |
|---|---|---|---|
| 6,134,010 A * | 10/2000 | Zavislan | G02B 21/0068 |
| | | | 250/201.3 |
| 9,719,928 B2 * | 8/2017 | Hell | G02B 21/0032 |

(Continued)

FOREIGN PATENT DOCUMENTS

| | | |
|---|---|---|
| CN | 103411941 A | 11/2013 |
| CN | 106970055 A | 7/2017 |

(Continued)

OTHER PUBLICATIONS

International Search Report (PCT/CN2021/133299); Date of Mailing: Jan. 26, 2022.

(Continued)

*Primary Examiner* — Mustak Choudhury
(74) *Attorney, Agent, or Firm* — Wiersch Law Group

(57) ABSTRACT

A super-resolution microscopic imaging method and apparatus based on common-path parallel fluorescence emission difference microscopy. In the method, a liquid crystal spatial light modulator is used to modulate excitation light in fluorescence emission difference microscopy super-resolution microscopic imaging, and two parts of the spatial light modulator are respectively loaded into 0-2π vortex phase modulation and blazed grating, so that the common-path excitation light forms solid spot and doughnut-shaped spot with a certain distance on a sample surface at the same time, and parallel scanning is carried out, thereby ensuring that the imaging speed is doubled compared with that of ordinary fluorescence emission difference super-resolution microscopic imaging, and at the same time, the two excitation (Continued)

lights are not easily affected by noise, drift and other interferences due to the common path.

8 Claims, 2 Drawing Sheets

(58) Field of Classification Search
CPC .. G02B 21/0068; G02B 21/008; G01N 21/64; G01N 21/6458; G01J 3/4406
See application file for complete search history.

(56) References Cited

U.S. PATENT DOCUMENTS

| | | | |
|---|---|---|---|
| 2004/0150880 A1* | 8/2004 | Nakata | G02B 21/0076 359/371 |
| 2009/0250632 A1* | 10/2009 | Kempe | G02B 21/0076 250/237 G |
| 2015/0009558 A1* | 1/2015 | Engelhardt | G02B 21/0076 359/385 |
| 2015/0211986 A1* | 7/2015 | Kuang | G01N 21/255 356/369 |

FOREIGN PATENT DOCUMENTS

| | | |
|---|---|---|
| CN | 107941763 A | 4/2018 |
| CN | 108120702 A | 6/2018 |
| CN | 109283674 A | 1/2019 |
| CN | 109632756 A | 4/2019 |
| CN | 110118726 A | 8/2019 |
| CN | 111257295 A | 6/2020 |
| CN | 111781173 A | 10/2020 |
| CN | 112649405 A | 4/2021 |
| IN | 110632045 A | 12/2019 |

OTHER PUBLICATIONS

First Office Action(CN202011357705.0); Date of Mailing: Aug. 31, 2021.
Improvement-of-imagine-resolution-of-fluorescence-emission-difference-super-resolution-microscopy-with-annular-pupil.
Frequency-Division-Multiplexed-Multichannel-High-Speed-Fluorescence-Confocal-Microscope.

* cited by examiner

SUPER-RESOLUTION MICROSCOPIC IMAGING METHOD AND APPARATUS BASED ON COMMON-PATH PARALLEL FLUORESCENCE EMISSION DIFFERENCE MICROSCOPY

CROSS-REFERENCE TO RELATED APPLICATIONS

The present application is a continuation of International Application No. PCT/CN2021/133299, filed on Nov. 25, 2021, which claims priority to Chinese Application No. 202011357705.0, filed on Nov. 27, 2020, the contents of both of which are incorporated herein by reference in their entireties.

TECHNICAL FIELD

The present application relates to the field of optical super-resolution microscopic imaging, in particular to a super-resolution microscopic imaging method and apparatus based on common-path parallel fluorescence emission difference microscopy.

BACKGROUND

In the fields of biology and life sciences, optical microscope is an important means to observe cells, organelles and viruses. However, due to the existence of diffraction and the aperture of the imaging system, the resolution of the optical microscope is limited. This limitation is called an Abbe diffraction limit, and the value is 0.61λ/NA, where λ is the wavelength of the light and NA is the numerical aperture of the objective lens.

To break through the diffraction limit, researchers put forward a variety of super-resolution microscopy techniques, among which fluorescence emission difference microscopy (FED) has low photobleaching characteristics and a fast imaging speed. The FED microscopic system includes two different modes of excitation light, one of which is confocal light, which appears as solid spot at the focal plane; the other path is negative confocal light, which shows a doughnut-shaped doughnut-shaped spot with an internal size smaller than the diffraction limit. The microscopic image of FED is obtained by the difference between these two images.

Considering that FED needs two images, in order to further improve the imaging speed, parallel fluorescence emission difference microscopy (PFED) uses a beam deflection apparatus to stagger the solid spot and the doughnut-shaped spot by a certain distance on the object plane, so that the sample can be scanned and detected by both. However, the two excitation light paths in pFED are easily disturbed by external disturbances such as drift and noise, which limits the imaging quality.

SUMMARY

The present application provides a super-resolution microscopic imaging method and apparatus based on common-path parallel fluorescence emission difference microscopy. Compared with the pFED method, the present application can better eliminate the influence of external interference such as drift, noise, and the like by the common path of excitation light instead of passing through different apparatuses.

The object of the present application is realized by the following technical solution:

On the one hand, the present application provides a super-resolution microscopic imaging method based on common-path parallel fluorescence emission difference microscopy.

The method includes the following steps.

(1) A laser beam emitted by a laser is collimated, and then the laser beam is converted into linearly polarized light by a polarizer. The linearly polarized light contains an S component and a P component.

(2) An exit plane of a liquid crystal spatial light modulator is adjusted to conjugate with an entrance pupil of a microscopic objective lens. A polarization component of the linearly polarized light in step (1) parallel to a direction which can be modulated by the spatial light modulator is modulated using half of the liquid crystal spatial light modulator by $0\text{-}2\pi$ vortex phase modulation, but a polarization component perpendicular to the adjusted polarization direction is not modulated.

(3) The emergent light of the liquid crystal spatial light modulator reaches a reflector after passing through a quarter-wave plate, and is reflected back to the same quarter-wave plate by the reflector. Then, the emergent light reaches the other half of the liquid crystal spatial light modulator.

(4) The other half of the liquid crystal spatial light modulator is loaded as a blazed grating, such that a unmodulated component of the linearly polarized light is modulated to be inclined, and an inclination angle is calculated by adjusting a grating constant according to a grating equation, such that solid spot and doughnut-shaped spot are finally staggered on an object plane.

(5) Two paths of light emitted from the other half of the spatial light modulator is converted into circularly polarized light.

(6) Two paths of the circularly polarized light presents staggered solid spot and doughnut-shaped spot on a sample plane, the solid spot and the doughnut-shaped spot scanning a sample at the same time, and excited two paths of fluorescence signals pass through respective detection light paths and is received by two detectors, respectively, thereby obtaining confocal light intensity distribution and negative confocal light intensity distribution.

(7) The negative confocal light intensity distribution is shifted to correspond to the confocal light intensity distribution, and a super-resolution image is obtained according to a fluorescence emission difference microscopy formula.

Further, in step (1), the polarization direction of the light beam is adjusted by a half-wave plate after passing through the polarizer; the polarization direction should be determined by a ratio of a negative confocal light intensity to a confocal light intensity, that is, the two intensities are matched by adjusting the polarization direction.

Further, in step (2), a D-shaped reflector is used to bend a light path before the linearly polarized light enters the liquid crystal spatial light modulator, so as to reduce an incident angle and improve the performance of the liquid crystal spatial light modulator.

Further, in the step (2), the modulation of a component of the linearly polarized light by the liquid crystal spatial light modulator is not limited to modulation into vortex light to form lateral doughnut-shaped spot, but also involves formation of axial doughnut-shaped spot on the object plane by $0/\pi$ annular phase modulation; the axial doughnut-shaped spot also have a weak hollow spot effect in the lateral direction, thereby realizing three-dimensional fluorescence emission difference super-resolution microscopic imaging, and a lateral resolution thereof is relatively weaker than that of the super-resolution microscopic imaging of the lateral doughnut-shaped spot, but a vertical resolution thereof can be greatly improved, so that more detailed information of samples can be obtained.

Further, in step (6), the solid spot and the doughnut-shaped spot scan the sample at the same time, and after defocused stray light is filtered by two pinholes, the fluorescence signals excited by the solid spot and the doughnut-shaped spot are obtained by two detectors respectively.

Further, in the step (6), staggered spots parallel scanning is obtained by loading a blazed grating with the liquid crystal spatial light modulator, which can reduce the difficulty of optical path calibration and correct the Zernike aberration of the spots to obtain optimal spots.

Further, in the step (6), the solid spot and the doughnut-shaped spot scan the sample at the same time, and four side-by-side adjacent multimode optical fibers can be installed, and fluorescence signals are received by optical fiber end faces at both ends and detected by photomultiplier tubes or avalanche photodiodes; the two optical fibers in the middle are not connected with detectors, so as to determine an interval between two fluorescence signals more conveniently.

Further, in the step (7), the fluorescence emission difference microscopy formula is as follows:

$$I(x,y)=I_1(x,y)-\gamma I_2(x+\Delta x,y+\Delta y)$$

where $I_1(x,y)$ is the confocal light intensity distribution, $I_2(x+\Delta x, y+\Delta y)$ is the shifted negative confocal light intensity distribution, and $\gamma$ is a difference coefficient.

Another aspect of the present application provides a super-resolution microscopic imaging apparatus based on common-path parallel fluorescence emission difference microscopy, which includes:
   a laser and a collimator for generating excitation light;
   a polarizer for generating linearly polarized light;
   a half-wave plate for adjusting a polarization direction;
   a liquid crystal spatial light modulator for respectively modulating two components of the linearly polarized light into vortex light and inclined light by using each half part;
   a quarter-wave plate for rotating the polarization direction of one component of the linearly polarized light by 90 degrees, a lens and a reflector;
   a quarter-wave plate and a half-wave plate for converting two excitation lights into circularly polarized lights;
   a dichroic mirror for reflecting excitation light and transmitting fluorescence;
   a scanning galvanometer and a microscope stand module for scanning samples;
   a filter for eliminating stray light;
   a pinhole or a multimode optical fiber for eliminating defocused stray light; and
   two detectors for detecting solid spot and doughnut-shaped spot, respectively.

Compared with the prior art, the present application has the following beneficial technical effects: because the two excitation lights share the same path, they pass through the same apparatus, and are affected by the drift of each apparatus and the introduced noise simultaneously, and these drifts and noises cancel out when the solid spot and the doughnut-shaped spot are differentiated, so that the signal-to-noise ratio of the super-resolution image is improved while the imaging speed is achieved.

DESCRIPTION OF EMBODIMENTS

In order to make the above objects, features and advantages of the present application more obvious and understandable, the following detailed description of the specific embodiments of the present application will be made with reference to the accompanying drawings.

In the following description, many specific details are set forth in order to fully understand the present application, but the present application can be implemented in other ways different from those described here, and those skilled in the art can make similar promotion without violating the connotation of the present application. Therefore, the present application is not limited by the specific embodiments disclosed below.

Figure 1:
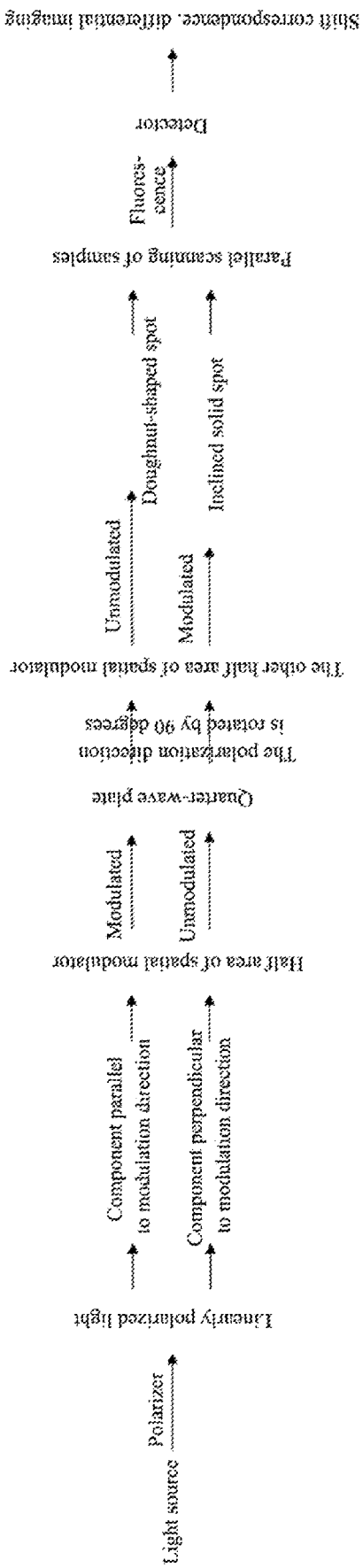
FIG. 1 is a flowchart of a super-resolution microscopic imaging method based on common-path parallel fluorescence emission difference microscopy according to an embodiment of the present application.

As shown in FIG. 1, the super-resolution microscopic imaging method based on common-path parallel fluorescence emission difference microscopy provided by the present application includes the following steps:
(1) after a laser beam emitted by a laser is collimated, it is converted into linearly polarized light by a polarizer, and this linearly polarized light contains a S component and a P component;
(2) the exit plane of a liquid crystal spatial light modulator is adjusted to conjugate with the entrance pupil of a microscope objective lens; the liquid crystal spatial light modulator has the property of modulating linearly polarized light in only one direction; when an applied electric field exceeds a threshold value, the liquid crystal molecules appear an electrically controlled birefringence effect, which makes the liquid crystal birefringent to the light in a corresponding direction; by using this property, the polarization component in step 1 parallel to that which can be modulated by the spatial light modulator is modulated by half of the liquid crystal spatial light modulator and 0-2π vortex phase modulation, while the polarization component perpendicular to the adjusted polarization direction is not modulated;
(3) the emergent light of the liquid crystal spatial light modulator reaches a reflector after passing through a quarter-wave plate, is reflected back to the same quarter-wave plate by the reflector, and then reaches the other half of the liquid crystal spatial light modulator; the light path is bent by the reflector so that the incident light passes through the quarter-wave plate twice and returns to the other half of the liquid crystal spatial light modulator; in this case, it means that the incident light passes through a half-wave plate, and the polarization direction is perpendicular to the original one, while the original unmodulated polarization component is rotated to the modulated polarization direction, so it can be modulated by the liquid crystal spatial light modulator, while the original modulated polarization component is perpendicular to the modulated polarization direction and not modulated by the liquid crystal spatial light modulator;
(4) the other half of the liquid crystal spatial light modulator is loaded as a blazed grating, so that the unmodulated component of the linearly polarized light is modulated and inclined; according to the grating equation (if it is a first-order blazed grating), the inclination angle can be calculated by adjusting the grating constant, so that the solid spot and the doughnut-shaped spot are finally staggered (by 2-3 AU in this embodiment) on the object plane;

(5) two paths of the light emitted from the other half of the spatial light modulator are converted into circularly polarized light; for example, a quarter-wave plate and a half-wave plate can be used to convert the two paths of light into circularly polarized light;

(6) two paths of circularly polarized light present staggered solid spot and doughnut-shaped spot on the sample plane, and the solid spot and the doughnut-shaped spot scan the sample at the same time; the excited two paths of fluorescence signals pass through their respective detection light paths and are received by two detectors, so as to obtain confocal light intensity distribution and negative confocal light intensity distribution; and (7) the negative confocal light intensity distribution is shifted to correspond to the confocal light intensity distribution, and a super-resolution image is obtained according to the fluorescence emission difference microscopy formula.

Furthermore, in the step (1), after the light beam passes through the polarizer, the polarization direction can be adjusted by a half-wave plate. The polarization direction should be determined by the ratio of the negative confocal light intensity to the confocal light intensity, that is, the two intensities are matched by adjusting the polarization direction.

Furthermore, in the step (2), a D-shaped reflector can be used to bend the light path before the linearly polarized light enters the liquid crystal spatial light modulator, so as to reduce the incident angle and improve the performance of the liquid crystal spatial light modulator.

Furthermore, in the step (2), the modulation of a component of the linearly polarized light by the liquid crystal spatial light modulator is not limited to modulating the component into vortex light to form lateral doughnut-shaped spot, but also involves formation of axial doughnut-shaped spot on the object plane by $0/\pi$ annular phase modulation; such axial doughnut-shaped spot also have a weak hollow spot effect in the lateral direction, thereby realizing three-dimensional fluorescence emission difference super-resolution microscopic imaging, and a lateral resolution thereof is relatively weaker than that of the super-resolution microscopic imaging of the lateral doughnut-shaped spot, but a vertical resolution thereof can be greatly improved, so that more detailed information of samples can be obtained.

Furthermore, in the step (6), the staggered spots parallel scanning is obtained by loading the blazed grating with the liquid crystal spatial light modulator, which can reduce the difficulty of optical path calibration and correct the Zernike aberration of the spots to obtain optimal spots.

Furthermore, in the step (6), the solid spots and the doughnut-shaped spot scan the sample at the same time, and after the defocused stray light is filtered by two pinholes, the fluorescence signals excited by the solid spot and the doughnut-shaped spot are obtained by two detectors respectively. In addition, a filter can be placed in front of the pinhole to eliminate stray light. The sample plane is conjugated with the pinhole plane, so that the oblique light and hollow light scan the sample and enter the pinhole.

Furthermore, in the step (6), the pinhole can be replaced by the end face of a multimode optical fiber, and four adjacent multimode optical fibers can be installed side by side, and the end faces of the optical fibers at both ends can be used to receive fluorescence signals, which are detected by a photomultiplier tube (PMT) or an avalanche photodiode (APD). The two optical fibers in the middle are not connected with the detector, so as to determine the interval between the two fluorescence signals more conveniently.

Further, in the step (7), the fluorescence emission difference microscopy formula is as follows:

$$I(x,y)=I_1(x,y)-\gamma I_2(x+\Delta x,y+\Delta y)$$

where $I_1(x,y)$ is the confocal light intensity distribution $I_2(x+\Delta x, y+\Delta y)$ is the shifted negative confocal light intensity distribution, and $\gamma$ is a difference coefficient.

To realize the above method, the imaging apparatus provided by the present application includes:

a laser and a collimator for generating excitation light;

a polarizer for generating linearly polarized light;

a half-wave plate for adjusting a polarization direction;

a liquid crystal spatial light modulator for respectively modulating two components of the linearly polarized light into vortex light and inclined light by using each half part;

a quarter-wave plate for rotating the polarization direction of one component of the linearly polarized light by 90 degrees, a lens and a reflector;

a quarter-wave plate and a half-wave plate for converting two excitation lights into circularly polarized lights;

a dichroic mirror for reflecting excitation light and transmitting fluorescence;

a scanning galvanometer and a microscope stand module for scanning samples;

a filter for eliminating stray light;

a pinhole or a multimode optical fiber for eliminating defocused stray light;

two detectors for detecting solid spot and doughnut-shaped spot, respectively; where the distance between the two detectors is 2-3AU in this embodiment.

Figure 2:
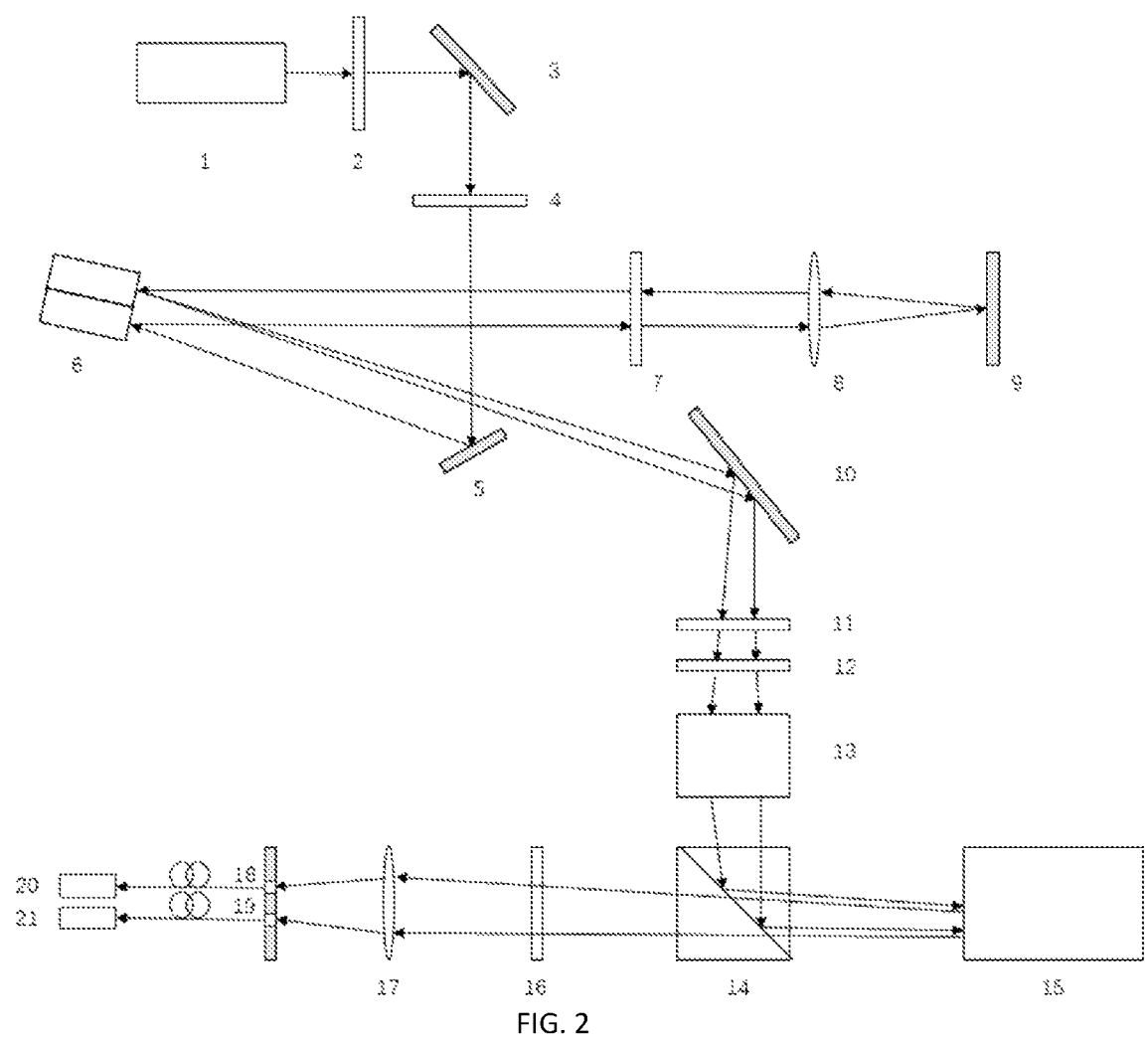
FIG. 2 is a schematic diagram of a super-resolution microscopic imaging apparatus based on common-path parallel fluorescence emission difference microscopy according to an embodiment of the present application.

A concrete implementation example of the present application is given below, but the present application is not limited thereto. The structure of the super-resolution microscopic imaging apparatus based on common-path real-time fluorescence emission difference microscopy of this example, as shown in FIG. 2, includes a laser generating and collimating apparatus 1, a polarizer 2, a first reflector 3, a first half slide 4, a D-shaped reflector 5, a liquid crystal spatial light modulator 6, a first quarter slide 7, a first lens 8, a second reflector 9, a third reflector 10, a second half slide 11, a second quarter slide 12, a 4f system 13, a dichroic mirror 14, a scanning galvanometer and microscope stand module 15, a filter 16, a second lens 17, a first multimode optical fiber 18, a second multimode optical fiber 19, a first avalanche diode 20 and a second avalanche diode 21.

When the apparatus works, the laser generated by the laser generating and collimating apparatus 1 passes through the polarizer 2, becomes linearly polarized, and after being reflected by the D-shaped reflector 5, it reaches the lower half of the liquid crystal spatial light modulator 6 at a small incident angle. Using the property that the liquid crystal spatial light modulator can only modulate polarized light in one direction, the P component of the linearly polarized light is modulated as vortex light here, while the S component is not modulated. The light emitted from the liquid crystal spatial light modulator 6 reaches the second reflector 9 after passing through the first quarter slide 7, and is reflected back to the first quarter slide 7 by the second reflector 9, and then reaches the upper half of the liquid crystal spatial light modulator 6. The second reflector 9 makes the incident light pass through the first quarter slide 7 twice and return to the upper half of the liquid crystal spatial light modulator 6. In this case, it means that the incident light passes through a half slide, so that the original S component is modulated and inclined in the upper half of the liquid crystal spatial light modulator 6, and the light is divided into two paths. Two paths of light are respectively incident on the second half glass slide 11 and the second quarter glass slide 12 to become circularly polarized light, and after passing through the 4$f$ system 13 for relay conjugation, the spectroscope 14, the scanning galvanometer and the microscope frame module 15 scan the sample in parallel, they reach the spectroscope 14 in the reverse direction. At this time, the excitation light is reflected, and the fluorescence signal passes through the spectroscope 14 and is guided into two multimode optical fibers after passing through the filter 16 and the second lens 17. Here, the end faces of the multimode optical fibers play the role of pinholes in common confocal microscopes. Finally the fluorescence signal is detected by two avalanche diodes, and then processed by subsequent algorithms to achieve super-resolution imaging.

The above is only the preferred embodiment of the present application. Although the present application has been disclosed in the preferred embodiment, it is not intended to limit the present application. Anyone who is familiar with the art can make many possible changes and modifications to the technical solution of the present application by using the above disclosed methods and technical contents without departing from the scope of the technical solution of the present application, or modify them into equivalent embodiments with equivalent changes. Therefore, any simple modifications, equivalent changes and modifications made to the above embodiments according to the technical essence of the present application that do not depart from the content of the technical solution of the present application are still within the scope of protection of the technical solution of the present application.

What is claimed is:

1. A super-resolution microscopic imaging method based on common-path parallel fluorescence emission difference microscopy, comprising:
   step (1), collimating a laser beam emitted by a laser, and converting the laser beam into linearly polarized light by a polarizer, wherein the linearly polarized light contains an S component and a P component;
   step (2), adjusting an exit plane of a liquid crystal spatial light modulator to conjugate with an entrance pupil of a microscopic objective lens; modulating a polarization component of the linearly polarized light in the step (1) parallel to a modulator polarization direction using half of the liquid crystal spatial light modulator by 0-2π vortex phase modulation, but not modulating a polarization component perpendicular to an adjusted polarization direction;
   step (3), emergent light of the liquid crystal spatial light modulator reaching a reflector after passing through a quarter-wave plate, being reflected back to the quarter-wave plate by the reflector, and reaching the other half of the liquid crystal spatial light modulator;
   step (4), loading the other half of the liquid crystal spatial light modulator as a blazed grating, in such a manner that an unmodulated component of the linearly polarized light is modulated to be inclined, and calculating an inclination angle by adjusting a grating constant according to a grating equation, in such a manner that solid spot and doughnut-shaped spot are staggered on an object plane;
   step (5), converting two paths of light emitted from the other half of the liquid crystal spatial light modulator into circularly polarized light;
   step (6), two paths of the circularly polarized light presenting staggered solid spot and doughnut-shaped spot on a sample plane, the solid spot and the doughnut-shaped spot scanning a sample at the same time, and exciting two paths of fluorescence signals to pass through respective detection light paths, respectively, and to be received by two detectors, and obtaining confocal light intensity distribution and negative confocal light intensity distribution; and
   step (7), shifting the negative confocal light intensity distribution to correspond to the confocal light intensity distribution, and obtaining a super-resolution image according to a fluorescence emission difference microscopy formula.

2. The super-resolution microscopic imaging method based on common-path parallel fluorescence emission difference microscopy according to claim 1, wherein in the step (1), the polarization direction of the light beam is adjusted by a half-wave plate after the light beam passes through the polarizer; the polarization direction is determined by a ratio of a negative confocal light intensity to a confocal light intensity, and intensities of the negative confocal light intensity and the confocal light intensity are matched by adjusting the polarization direction.

3. The super-resolution microscopic imaging method based on common-path parallel fluorescence emission difference microscopy according to claim 1, wherein in the step (2), a D-shaped reflector is configured to bend a light path before the linearly polarized light enters the liquid crystal spatial light modulator, so as to reduce an incident angle and improve performance of the liquid crystal spatial light modulator.

4. The super-resolution microscopic imaging method based on common-path parallel fluorescence emission difference microscopy according to claim 1, wherein in the step (2), a component of the linearly polarized light is capable of being modulated by the liquid crystal spatial light modulator into vortex light to form lateral doughnut-shaped spot, or onto the object plane through 0/π annular phase modulation to form axial doughnut-shaped spot; the axial doughnut-shaped spot has a weak hollow spot effect in a lateral direction, so as to implement three-dimensional fluorescence emission difference super-resolution microscopic imaging, and a lateral resolution of the three-dimensional fluorescence emission difference super-resolution microscopic imaging is weaker than a lateral resolution of a super-resolution microscopic imaging of the lateral doughnut-shaped spot, but a vertical resolution of the super-resolution microscopic imaging of the lateral doughnut-shaped spot is improved, so as to obtain more detailed information of samples.

5. The super-resolution microscopic imaging method based on common-path parallel fluorescence emission difference microscopy according to claim 1, wherein in the step (6), the solid spot and the doughnut-shaped spot scan the sample at the same time, and after defocused stray light is filtered by two pinholes, the fluorescence signals excited by the solid spot and the doughnut-shaped spot are obtained by two detectors, respectively.

6. The super-resolution microscopic imaging method based on common-path parallel fluorescence emission difference microscopy according to claim 1, wherein in the step (6), staggered spots parallel scanning is obtained by loading a blazed grating through the liquid crystal spatial light modulator to ease calibrating an optical path and correct a Zernike aberration of spots to obtain optimal spots.

7. The super-resolution microscopic imaging method based on common-path parallel fluorescence emission difference microscopy according to claim 1, wherein in the step (6), the solid spot and the doughnut-shaped spot scan the sample at the same time, and four side-by-side adjacent multimode optical fibers are provided, and fluorescence signals are received by optical fiber end faces of multimode optical fibers at both ends and detected by a photomultiplier tube or an avalanche photodiode; and two middle optical fibers are not connected with a detector, so as to ease determining an interval between two fluorescence signals.

8. The super-resolution microscopic imaging method based on common-path parallel fluorescence emission difference microscopy according to claim 1, wherein in the step (7), the fluorescence emission difference microscopy formula is as follows:

$$I(x,y)=I_1(x,y)-\gamma I_2(x+\Delta x, y+\Delta y)$$

where $I_1(x,y)$ is the confocal light intensity distribution, $I_2(x+\Delta x, y+\Delta y)$ is the shifted negative confocal light intensity distribution, and $\gamma$ is a difference coefficient.

* * * * *